Dec. 13, 1949    F. B. DIBBLE ET AL    2,491,093
LENS MOUNT
Filed Dec. 28, 1948    2 Sheets-Sheet 1

FRANK B. DIBBLE
EDWARD G. MERCIER
JEAN A. DUVOISIN
CHARLES K. GAERTNER
INVENTORS

BY *H. L. Mackey*
ATTORNEY

Dec. 13, 1949  F. B. DIBBLE ET AL  2,491,093
LENS MOUNT

Filed Dec. 28, 1948  2 Sheets-Sheet 2

FRANK B. DIBBLE
EDWARD G. MERCIER
JEAN A. DUVOISIN
CHARLES K. GAERTNER
INVENTORS

BY
ATTORNEY

Patented Dec. 13, 1949

2,491,093

UNITED STATES PATENT OFFICE 2,491,093

LENS MOUNT

Frank B. Dibble, Pleasantville, Edward G. Mercier, Flushing, Jean A. Duvoisin, Briarcliff, and Charles K. Gaertner, Scarsdale, N. Y., assignors to General Precision Laboratory Incorporated, a corporation of New York Application December 28, 1948, Serial No. 67,642

12 Claims. (Cl. 88—57)

This invention relates to a lens mount, and more particularly to a lens mount of the type which is subject to frequent adjustment to secure proper focusing.

Although not limited thereto, the invention is particularly adapted for use on projectors where the proper focus is attained by first roughly adjusting the position of the lenses until a fairly sharp image appears on the projection screen and then by more precise adjustment attaining the exact focus to produce the sharpest image.

One purpose of the invention, therefore, is to provide a lens mount which permits of both a rapid coarse adjustment and a fine critical adjustment.

Another purpose of the invention resides in the provision of a lens mount which positively locks the lens in the required position of adjustment so that when the critical focus has been achieved it is not subject to accidental dislodgement.

Still another purpose of the invention relates to the provision of a lens mount whereby the adjustment of the lens is accomplished smoothly and without mechanical slack or bending.

The exact nature of the invention will be apparent from the following description when considered together with the attached drawings, in which.

Figure 1:
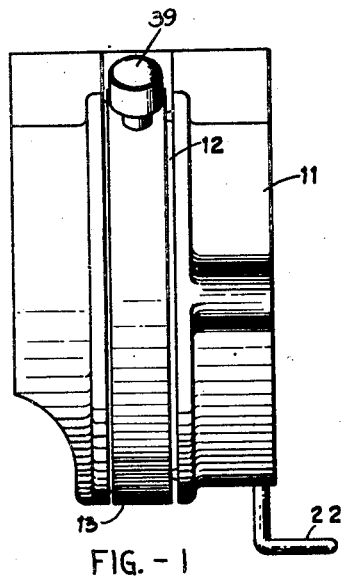
Figure 1 is an elevational view of the lens mount.

Referring now to the drawings a casing 11 is provided with an arcuate slot 12 an open portion of which extends partially around the body of the casing and into which an adjusting ring 13 is fitted.

The casing 11 has a central bore 14 accommodating a split adjusting and clamping sleeve 16 into which in turn is fitted a lens tube 17 provided with the usual lens elements 18 and 19.

The adjusting and clamping sleeve 16 is split longitudinally of its length at 21 (see Figs. 3 and 6) and is made of such an internal diameter that in a non-expanded condition the internal bore of the sleeve is slightly less than the external diameter of the lens tube 17 so that the lens tube is tightly clamped thereby and held in immovable position as respects the adjusting and clamping sleeve.

Figure 6:
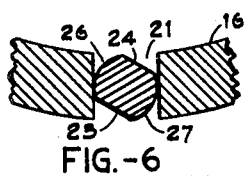
Figure 6 is an enlarged view in section of a portion of the clamping sleeve and cam rod therefor.

A cam rod having an actuating handle 22 has a cam portion extending for a part of its length located in the longitudinal split 21 formed in the sleeve 16. This cam portion, best indicated in Fig. 6, is constructed by machining or otherwise forming two flattened side portions 23, 24 on a cylindrical rod, the distance between the flattened portions being substantially the width of the slit 21 cut in the sleeve 16 when the sleeve is in its contracted position. On the other hand the distance between the curved surfaces 26 and 27 of the cam portion is somewhat greater so that when the cam rod is rotated to bring the curved surfaces in contact with the edges of the sleeve 16 contiguous to the slit 21, a camming action takes place causing the slit to be widened and the sleeve to be expanded.

Figure 3:
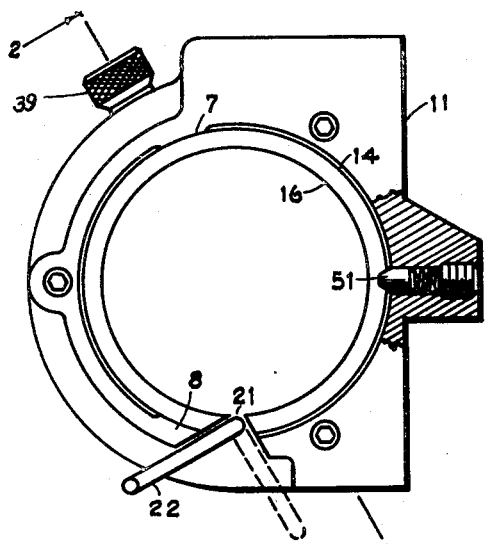
Figure 3 is an end view of the lens mount having a portion thereof in section.

This relationship is illustrated in Fig. 6 and corresponds to the dotted position of the handle 22 in Fig. 3, the solid line position corresponding to the position of the handle when the flat faces of the cam rod are brought opposite the edges of the sleeve adjacent the slit 21, this latter position allowing the sleeve to contract by its natural resilience.

Figure 7:
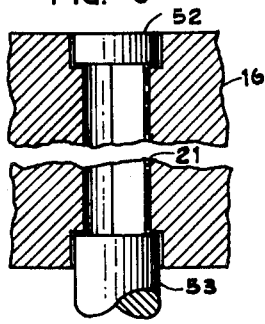
Figure 7 is an enlarged view partly in section illustrating the manner in which the cam rod is retained in the clamping sleeve.

The manner in which the cam rod is retained in the slit portion 21 of the sleeve is best illustrated in Fig. 7. The cam rod at each end beyond its cam portion is provided with enlarged portions 52 and 53 cylindrical in cross section. The sleeve 16 is bored out for a short distance at each end of the split portion 21 so that cooperating arcuate surfaces are provided to receive the enlarged cylindrical portions of the cam rod. In assembling the split of the sleeve is expanded to an extent somewhat greater than the expansion which occurs by reason of the actuation of the cam rod and the enlarged cylindrical portions 52 and 53 of the cam rod snapped into place. The rod is then retained in position against any but rotary motion.

As heretofore stated when the sleeve 16 is in its normal contracted relation its internal diameter is such as to tightly grip the lens tube 17 preventing relative movement between these parts. When, however, the sleeve is expanded by rotation of the cam rod so that the opposing faces of the sleeve split are forced farther apart, the internal diameter of the sleeve 16 is likewise increased to such an extent that the lens tube may be manually slid longitudinally thereof providing a coarse adjustment of the focus of the lens. Expansion of the split sleeve 16 is permitted by the arrangement consisting of the lands 7 and 8 and the spring pressed detents 51. The lands or surfaces 7, 8 locate the split sleeve 16 in the internal bore 14 of the housing 11 co-operating with the spring detent 51 for this purpose. At the same time any expansion of the sleeve 16 caused by rotation of the cam rod to the dotted line position of Fig. 3 merely depresses the detents 51 by the required amount, the sleeve 16 being supported by the lands 7 and 8 and the detent 51 in the same manner as when the sleeve is unexpanded. When proper tolerances are observed, however, the amount that the sleeve must expand to change from a position where it rigidly clamps the lens tube to a position where the lens tube may slide freely therein is not great requiring an expansion of the slit portion of the sleeve only of the order of .01 inch.

The fine focusing adjustment is provided by the cooperative action of the adjusting ring 13 and the clamping sleeve 16.

Figure 2:
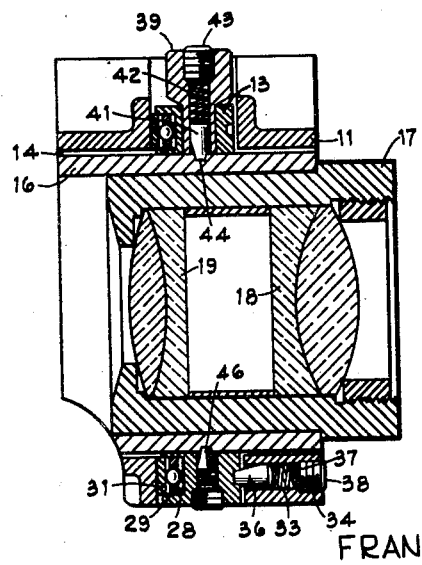
Figure 2 is a sectional view of the lens mount taken on the line 2—2 of Fig. 3.
Figure 5:
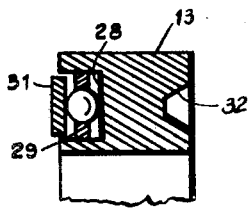
Figure 5 is an enlarged sectional view of a portion of the adjusting ring of the invention.

The adjusting ring 13 as heretofore stated is mounted in an arcuate slot cut in the casing 11. One face of the adjusting ring is provided with a circular channel 28 rectangular in cross section into which is fitted a ball race 29 which abuts a bearing ring 31 positioned between one face of the arcuate slot cut in the casing 11 and the ball race (see Figs. 2 and 5). The opposite end face of the adjusting ring 13 is provided with a circular channel 32 of modified V shape in cross section. Cooperating with this groove are three guide and bearing elements inserted in the casing 11, one of which is illustrated in the cross sectional view of Fig. 2.

The casing 11 is provided with equally spaced drill holes 33 extending from the outer vertical face thereof to the arcuated channel into which the adjusting ring 13 is fitted. The outer portions of these holes are threaded at 34 while the remainder thereof presents a smooth internal surface. A plug bearing member 36 composed of a phenol condensation product is located in the smooth portion of the drill hole and is urged inwardly into engagement with the channel 32 in the ring 13 under pressure of a spring 37, the other end of which engages a threaded member such as a set screw 38 engaging the threaded portion 34 of the drill hole.

The ring 13 is, therefore, held in rotatable engagement with the casing 11 by engagement with the ball race 29 on one face and engagement with the spring pressed bearing plug 36 on the other.

The adjusting ring 13 is provided with an actuating knob 39 press fitted into a hole drilled therein so that the rotation of the knob about the axis of the lens assembly results in a similar rotation of the adjusting ring 13.

The knob is provided with a central bore the outward end of which is threaded and in this bore there is positioned a resiliently pressed assembly similar to that just described consisting of a bearing plug 41, spring 42 and threaded fastening 43. Similarly, diametrically opposite the knob 39 another bearing plug assembly 46 of the same construction is inserted in a hole drilled into the adjusting ring 13.

Figure 4:
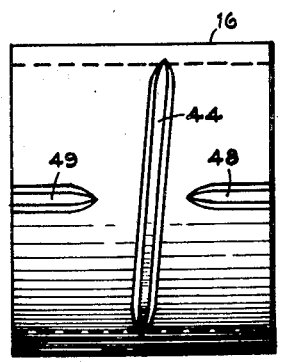
Figure 4 is a detail view in side elevation of the lens adjusting and clamping sleeve.

These bearing plugs engage interrupted helical grooves cut in opposite sides of the clamping sleeve 16, one such groove being illustrated at 44 of Fig. 4. Inasmuch as the groove 44 and the opposite groove thereto have helical leads, rotation of the adjusting ring causes the bearing plugs 44 and 46 to force the sleeve in a longitudinal direction either into or out of the casing as the plugs move in circular paths in a plane normal to the axis of the assembly.

The longitudinal movement of the sleeve 16 thus produced results in a similar movement of the lens tube 17 clamped therein by the resilient engagement of the sleeve when the sleeve is in its normal or contracted condition. This movement, therefore, provides the fine focusing adjusting and approximately 120° of rotation of the adjusting ring is sufficient to accomplish the maximum amount of such adjustment as will be required in use. The helical grooves may, therefore, be so positioned that each point along the arcuate path of one is diametrically opposed to a similar point in the arcuate path of the other without necessitating a crossing of these grooves.

As an added guide means for the longitudinal movement of the sleeve 16, and to prevent rotational movement thereof longitudinal grooves or guideways 48 and 49 are cut therein which cooperate with a bearing plug assembly (see Fig. 3) consisting of a spring pressed plug 51 composed of a phenol condensation product.

By the use of diametrically opposed plug members 44 and 46 cooperating with helical or inclined grooves 47 the force exerted on the sleeve 16 which moves it longitudinally is applied at two widely spaced points and the tendency for the sleeve to cock or tilt in the casing and thereby bend is avoided. It has also been discovered that the smoothest adjusting action is attained when the bearing plug member such as 36, 44, 46 and 51 are composed of a penol condensation product, however, those skilled in the art will recognize that other similar mechanisms yielding nearly the same results may be employed such as spring pressed ball detents and the like.

The lens mount of this invention, therefore, provides easy and smooth adjustment of the focus and at the same time positively locks the lens in position so that it may not be accidentally displaced.

What is claimed is:

1. An adjustable lens mount comprising, a casing member, a sleeve mounted in said casing member, said sleeve having a split portion longitudinally of its length, cam means positioned in said split portion and cooperating with the edges of said sleeve adjacent said split portion for increasing the width of said split portion and expanding said sleeve against the resilient force of said sleeve in one position of movement of the cam means, the resilience of said sleeve returning it to its normal contracted position in another position of movement of said cam means, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, and a rotary member carried by said casing member and engaging said sleeve for effecting longitudinal adjustment of said sleeve and lens tube by rotation of said rotary member.

2. An adjustable lens mount comprising, a casing member, a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, and a rotary member carried by said casing member and engaging said sleeve for effecting longitudinal adjustment of said sleeve and lens tube by rotation of said rotary member.

3. An adjustable lens mount comprising, a casing member, a sleeve mounted in said casing member, said sleeve having a split portion longitudinally of its length, cam means positioned in said split portion and cooperating with the edges of said sleeve adjacent said split portion for exerting force thereagainst and expand the sleeve in one position of movement but exerting no force on said edges in another position of movement thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, at least one guideway in said sleeve, means carried by said casing member and coacting with said guideway to prevent rotary movement of said sleeve while permitting longitudinal movement thereof, and a rotary member carried by said casing member and engaging said sleeve for effecting longitudinal movement of said sleeve and lens tube by rotation of said rotary member.

4. An adjustable lens mount comprising, a casing member, a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, at least one guideway in said sleeve, means carried by said casing member, and coacting with said guideway to prevent rotary movement of said sleeve while permitting longitudinal movement thereof, and a rotary member carried by said casing member and engaging said sleeve for effecting longitudinal movement of said sleeve and lens tube by rotation of said rotary member.

5. An adjustable lens mount comprising, a casing member, a sleeve mounted in said casing member, said sleeve having a split portion longitudinally of its length, cam means positioned in said split portion and cooperating with the edges of said sleeve adjacent said split portion for increasing the width of said split and expanding said sleeve against the resilient force of said sleeve in one position of movement of the cam means, the resilience of said sleeve returning it to its normal contracted position in another position of movement of said cam means, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, a ring member rotatably mounted in said casing member and fixed against longitudinal movement with respect thereto, a spring detent carried by said ring member and projecting from the inner surface thereof, a helical groove on the exterior surface of said sleeve cooperating with said detent and effecting longitudinal movement of said sleeve and lens tube on rotation of said ring member.

6. An adjustable lens mount comprising, a casing member, a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, a ring member rotatably mounted in said casing member and fixed against longitudinal movement with respect thereto, a spring detent carried by said ring member and projecting from the inner surface thereof, a helical groove on the exterior surface of said sleeve cooperating with said detent and effecting longitudinal movement of said sleeve and lens tube on rotation of said ring member.

7. An adjustable lens mount comprising, a casing member, a sleeve mounted in said casing member, said sleeve having a split portion longitudinally of its length, cam means positioned in said split portion and cooperating with the edges of said sleeve adjacent said split portion for exerting force thereagainst and expand the sleeve in one position of movement but exerting no force on said edges in another position of movement thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, at least one guideway in said sleeve, means carried by said casing member and coacting with said guideway to prevent rotary movement of said sleeve while permitting longitudinal movement thereof, a ring member rotatably mounted in said casing member and fixed against longitudinal movement with respect thereto, a spring detent carried by said ring member and projecting from the inner surface thereof, a helical groove on the exterior surface of said sleeve cooperating with said detent and effecting longitudinal movement of said sleeve and lens tube on rotation of said ring member.

8. An adjustable lens mount comprising, a casing member a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, at least one guideway in said sleeve, means carried by said casing member and coacting with said guideway to prevent rotary movement of said sleeve while permitting longitudinal movement thereof, a ring member rotatably mounted in said casing member and fixed against longitudinal movement with respect thereto, a spring detent carried by said ring member and projecting from the inner surface thereof, a helical groove on the exterior surface of said sleeve cooperating with said detent and effecting longitudinal movement of said sleeve and lens tube on rotation of said ring member.

9. An adjustable lens mount comprising, a casing member, a sleeve mounted in said casing member, said sleeve having a split portion longitudinally of its length, cam means positioned in said split portion and cooperating with the edges of said sleeve adjacent said split portion for increasing the width of said split and expanding said sleeve against the resilient force of said sleeve in one position of movement of the cam means, the resilience of said sleeve returning it to its normal contracted position in another position of movement of said cam means, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, a ring member rotatably mounted in said casing member and fixed against longitudinal movement with respect thereto, a first spring detent carried by said ring member and projecting from the inner surface thereof, a second spring detent carried by said ring member and projecting from the inner surface thereof at a point substantially diametrically opposed to said first spring detent, helical partial grooves on the exterior surface of said sleeve coacting with said first and second detents and effecting longitudinal movement of said sleeve and lens tube on rotation of said ring member.

10. An adjustable lens mount comprising, a casing member, a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, a ring member rotatably mounted in said casing member and fixed against longitudinal movement with respect thereto, a first spring detent carried by said ring member and projecting from the inner surface thereof, a second spring detent carried by said ring member and projecting from the inner surface thereof at a point substantially diametrically opposed to said first spring detent, helical partial grooves on the exterior surface of said sleeve coacting with said first and second detents and effecting longitudinal movement of said sleeve and lens tube on rotation of said ring member.

11. An adjustable lens mount comprising, a casing member, a sleeve mounted in said casing member, said sleeve having a split portion longitudinally of its length, cam means positioned in said split portion and cooperating with the edges of said sleeve adjacent said split portion for exerting force thereagainst and expand the sleeve in one position of movement but exerting no force on said edges in another position of movement thereof whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by said cam means, at least one guideway in said sleeve, means carried by said casing member and coacting with said guideway to prevent rotary movement of said sleeve while permitting longitudinal movement thereof, a ring member rotatably mounted in said casing member and fixed against longitudinal movement with respect thereto, a first spring detent carried by said ring member and projecting from the inner surface thereof, a second spring detent carried by said ring member and projecting from the inner surface thereof at a point substantially diametrically opposed to said first spring detent, helical partial grooves on the exterior surface of said sleeve coacting with said first and second detents and effecting longitudinal movement of said sleeve and lens tube on rotation of said ring member.

12. An adjustable lens mount comprising, a casing member, a sleeve mounted in said casing member, said sleeve having a split portion longitudinally of its length, a rotatable cam rod positioned in said split portion, at least a portion of said cam rod having cam surfaces thereon which coact with the edges of the sleeve adjacent said split portion to expand the sleeve in one rotative position of the cam rod, but which exert no force on said edges in another rotative position whereby the sleeve is returned to its normal contracted position, a lens carrying tube mounted in said sleeve, the relative interior diameter of said sleeve and the external diameter of said lens tube being such that the lens tube is tightly gripped by said sleeve when in its normal contracted position but is slidable therein when said sleeve is expanded by actuation of said cam rod, at least one guideway in said sleeve, means carried by said casing member and coacting with said guideway to prevent rotary movement of said sleeve while permitting longitudinal movement thereof, a ring member rotatably mounted in said casing member and fixed against longitudinal movement with respect thereto, a first spring detent carried by said ring member and projecting from the inner surface thereof, a second spring detent carried by said ring member and projecting from the inner surface thereof at a point substantially diametrically opposed to said first spring detent, helical partial grooves on the exterior surface of said sleeve coacting with said first and second detents and effecting longitudinal movement of said sleeve and lens tube on rotation of said ring member.

FRANK B. DIBBLE.
EDWARD G. MERCIER.
JEAN A. DUVOISIN.
CHARLES K. GAERTNER.

REFERENCES CITED

The following references are of record in the file of this patent:

UNITED STATES PATENTS

| Number | Name | Date |
| --- | --- | --- |
| 1,688,441 | Stewart | Oct. 23, 1928 |
| 1,855,775 | Shapiro | Apr. 26, 1932 |
| 1,954,876 | Joannides | Apr. 17, 1934 |
| 2,116,704 | Laube et al. | May 10, 1938 |
| 2,428,719 | Nemeth | Oct. 7, 1947 |